June 22, 1954 — G. F. KUHNE — 2,681,653
HYPODERMIC INJECTION ORIFICE STRUCTURE AND METHOD OF MAKING SAME
Filed Sept. 6, 1950 — 2 Sheets-Sheet 1

INVENTOR
George F. Kuhne
BY Duell and Kane
ATTORNEYS

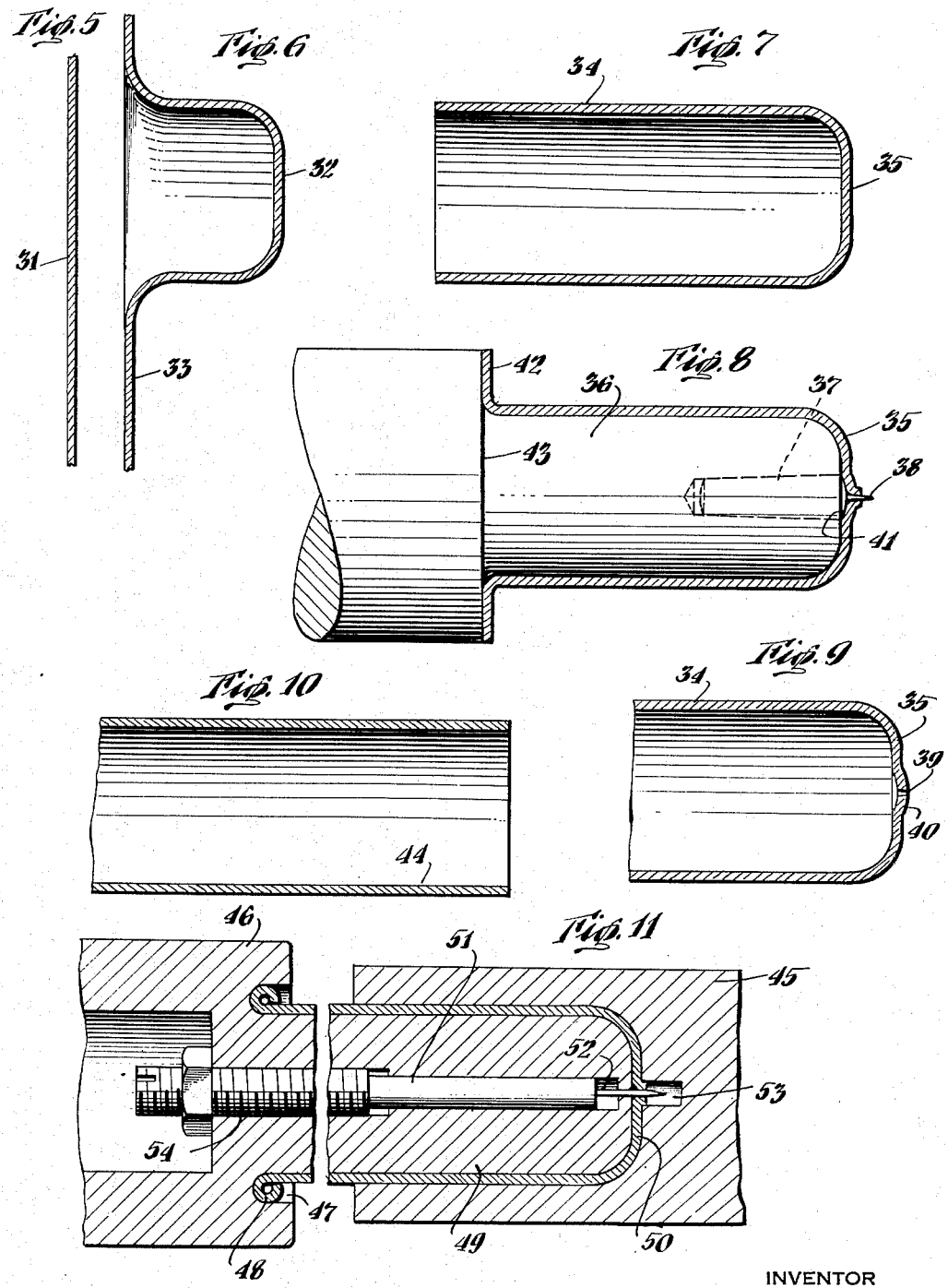

Patented June 22, 1954

2,681,653

UNITED STATES PATENT OFFICE 2,681,653

HYPODERMIC INJECTION ORIFICE STRUCTURE AND METHOD OF MAKING SAME

George F. Kuhne, Rutherford, N. J., assignor to Becton, Dickinson and Company, Rutherford, N. J., a corporation of New Jersey Application September 6, 1950, Serial No. 183,429

3 Claims. (Cl. 128—173)

This invention relates to the art of hypodermically injecting medicaments. In its more specific aspects it aims to provide an orifice structure by means of which medicaments may be discharged or ejected at velocities and pressures such that they will penetrate the epidermis without it being necessary to employ skin-piercing cannulas or needles.

By means of the present invention an orifice structure is furnished at relatively nominal cost; the medicament ejected therethrough being dischaged in a desirable manner so that pain is minimized or eliminated and a desired injection pattern produced.

Reference is had to the attached sheets of drawings illustrating practical embodiments of the invention and in which:

Fig. 5 is a fragmentary sectional view of a blank which may be employed to produce the desired structure;

Figs. 6, 7, 8 and 9 illustrate successive steps in the treatment of the material to produce the desired final structure;

Fig. 10 is a fragmentary sectional view of a portion of tubing which may also be employed to embody the orifice structure; and Fig. 11 illustrates the final state in the formation of that structure.

Figure 1:
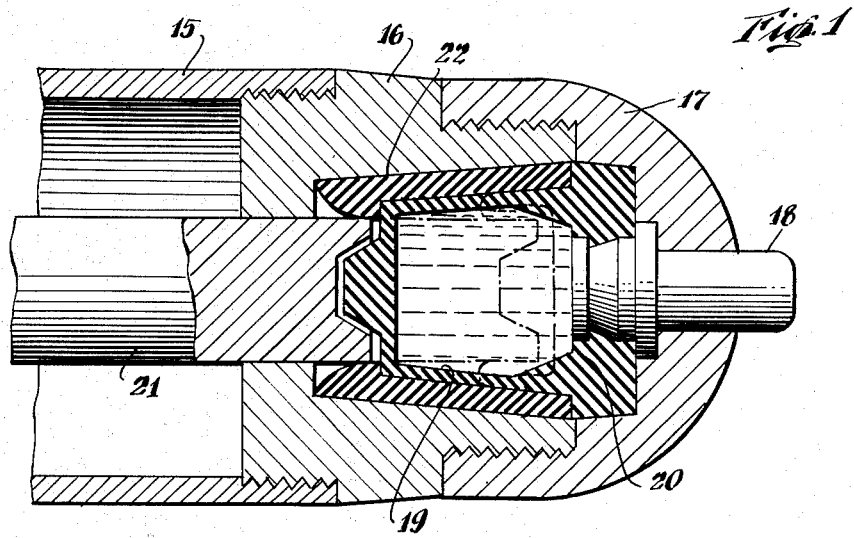
Fig. 1 is a fragmentary sectional side view of a hypodermic injection apparatus embracing an orifice structure embodying the present teachings.

As afore brought out, the present invention relates to the art of hypodermic injections of medicaments and especially velocity injections. As is well known, that type of injection does not require the use of a skin-piercing needle. Rather, the medicament is discharged at velocities and pressures in a sufficiently fine stream such that it pierces the epidermis and lodges at a desired depth in the underlying tissues. Apparatus for achieving this result may take one of numerous different forms. In Fig. 1 the numeral 15 indicates the body of one such type of apparatus which provides at its outer end an assembly including a member 16 defining a medicament chamber and a loading cap 17 mounted by that member. The loading cap in the embodiment under consideration is formed with a central opening through which the end of a nozzle 18 may extend.

That nozzle communicates with the medicament chamber. Such chamber may take numerous different forms and in certain instances can directly receive the medicament to be injected. However, it is ordinarily preferred that the medicament be contained in an ampule. Such an ampule conveniently includes a sack-shaped body 19 formed of rubber or other suitable material and terminating in an inwardly extending flange portion 20. The base of the sack is engaged and shifted by, for example, a reciprocal plunger 21. When the latter is projected to discharge medicament through the nozzle the body of the sack may invert upon itself to, for example, the position indicated in dotted lines in Fig. 1. A supporting liner 22 again conveniently formed of rubber, may be interposed between the face of member 16 and the sack. The latter has the surfaces of its flange portion 20 corresponding to and in engagement with the adjacent surfaces at the base of the nozzle to connect these parts.

Figure 4:
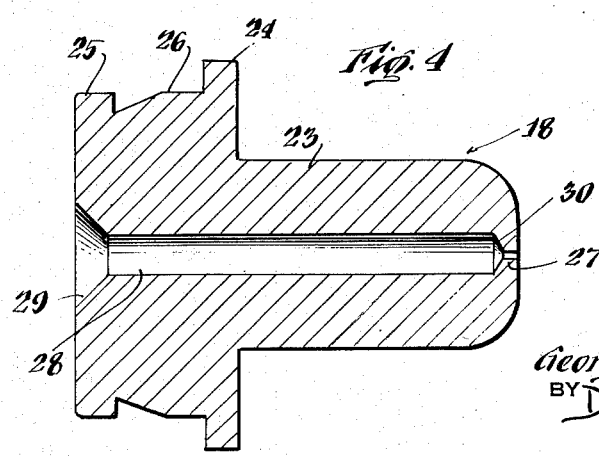

It is to be emphasized that the apparatus as just described illustrates merely one embodiment of a velocity injection assembly. Likewise, various forms of ampules might be employed in lieu of the flexible or rubber sack structure. Where undesirable, a separate nozzle need not be included as part of the assembly. Rather, the orifice structure can be formed in any proper portion providing an end wall be disposed adjacent or in contact with the tissues to be injected. Thus, in the following description and appended claims, the term "wall" will be used in a generic sense and regardless of whether the wall forms a part of a separate nozzle or the body of the ampule or medicament containing member. Thus, referring to Figs. 2, 3 and 4, the numeral 23 identifies a wall portion forming a nozzle tip a base defined, for example, by outer and inner flanges 24 and 25 respectively. Intermediate these flanges an angularly extending surface 26 is disposed. The adjacent flange surfaces of the ampule body are formed to complement the surfaces 24, 25 and 26. Therefore, as shown in Fig. 1, the ampule body and nozzle are coupled against accidental separation with the flange portion 20 intervening flange 24 and overlapping flange 25; portion 20 being conveniently in a slight state of compression. In this manner a leak-proof seal is also furnished.

Figures 2, 3:
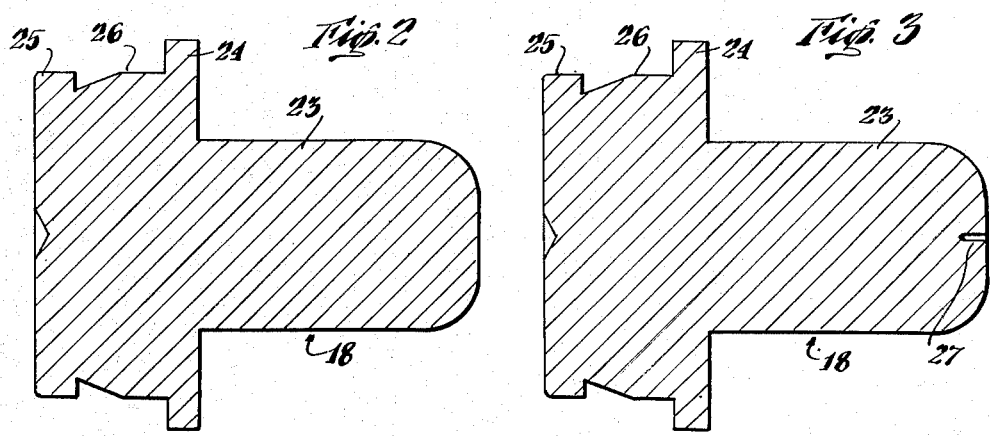
Fig. 2 is an enlarged sectional side view of the blank or unit which is to embody that structure.
Figs. 3 and 4 are views similar to Fig. 2 but illustrating the unit in intermediate and final stages of manufacture.

A part such as has been shown in Fig. 2 having been provided, that part has its orifice drilled as at 27. Conveniently such drilling may embrace a depth of around .021". The diameter of the orifice may be approximately .004". In no instances should it exceed a diameter of approximately .01". Thereafter the rear face of wall 23 is drilled or otherwise formed with a passage which communicates and is aligned with the passage 27. This has been shown in Fig. 4. The passage 28 thus formed may have a diameter, for example, of .04". The overall height of nozzle 23 may be around .436". The outer end of passage 28 is preferably defined by a flared mouth 29 which may involve an angle of 45° with respect to the axis of the unit. Adjacent the inner end of passage 27 an angular face 30 is preferably formed which may encompass an angle in the neighborhood of 118°. With the formation of passage 28 the effective length of the orifice defining passage 27 will be reduced (again for example), to .016".

In the event it is not desired to form the orifice structure as part of a solid unit, it may be provided from sheet metal. A fragment of that metal has been shown at 31 in Fig. 5. Ordinarily the thickness or gauge of the metal should not exceed .04" and may preferably be around .02". The nozzle is formed preferably by a series of separate steps although in certain instances other techniques may be followed. Where a series of drawing steps are employed, then as in Fig. 6, the layer of metal 31 may be manipulated on a suitable press to be drawn out in the form of a cup-shaped member having a base portion 32 and a laterally extending flange portion 33. Continuing the operation a shell 34 is furnished as in Fig. 7 which is characterized by a cylindrical body portion open at its rear end and having a closed outer end 35. It is through the latter wall that the structure defining the desired orifice is provided.

That orifice is formed as in Fig. 8 by conveniently employing a plunger 36. This plunger may mount upon an insert 37, a forwardly projecting pin 38. If the thickness of the wall providing base portion 35 is on the order of .02" then the effective length of pin 38 may be from .03" to .04". The die which is employed will, of course, provide a recess for the accommodation of the projecting end portion of the pin. The latter is preferably tapered and will involve a diameter at a point approximately .02" from its base of around .004" or any desired orifice diameter. If, as in Fig. 9, the orifice 39 is to be centrally disposed in an outwardly dimpled portion 40 then the plunger 36 or its insert 37 may be outwardly bulged as at 41 to embody the desired configuration.

Presuming that the unit as shown in Figs. 8 and 9 is to be in the form of a nozzle for association with an ampule body such as a sack, then its open mouth may be defined by a flange portion 42. That flange portion will, of course, allow of a proper coupling to the ampule body. To provide the desired flange, the plunger 36 may embody a shoulder portion 43 which will engage with the outer edge of wall 34 to cause the same to extend radially or in any other desired manner. Where, of course, the unit as shown in Figs. 8 and 9 provides the ampule proper then no such flange portion is necessary. In both instances, the base wall 35 will be formed with the orifice and regardless of whether dimpling such as 40 is used or not.

As in Figs. 10 and 11 the nozzle unit or ampule body may be furnished by, for example, tubing as shown at 44 in the former figure. That tubing is inserted in a die 45 as in Fig. 11 and a plunger 46 is projected towards that die. The plunger is conveniently provided with recess 47 such that the open end of the tubing is flanged outwardly as at 48. As afore brought out, such flanging will not be necessary if an ampule body is being provided. With the main forming portion 49 of the plunger assembly projected and with the rear edges of the tubing 44 engaged by the lateral surface of plunger 46, the forward end of the tubing will be pushed inwardly to provide a base wall 50. Plunger 46 may carry a rod 51 terminating in a reduced point portion 52 having a diameter corresponding to the injection orifice to be furnished. That point may be received by a socket 53 formed in die 45. The position of rod 51 may be adjusted by, for example, a threaded rod and nut structure 54. Preferably the effective exposed length of portion 52 will, however, not be materially in excess of the wall thickness of tubing 44. After the operation in Fig. 11 has been completed, any burrs or other undesired parts may be removed from the outer surface of the base wall. The same is true of the structure shown in Fig. 9.

While it is feasible to employ different materials to provide the desired walls within which the orifices are formed, such walls will preferably be of metal. In the structure shown in Figs. 5 to 11 inclusive, the metal employed will conveniently be stainless steel. Regardless of whether a nozzle or ampule unit is being produced, the thickness of the wall with such material may be on the order of .02" and should preferably in no event exceed .04". As will be appreciated the steps in the formation of the article have herein been somewhat diagrammatically illustrated in that a detailed showing thereof appears to be unnecessary to a full understanding of the invention.

Obviously the unit may embrace any desired exterior configuration. Also, the steps in its formation may be varied in accordance with accepted technique.

I claim:

1. For use in a hypodermic injection assembly in which medicament is ejected at velocities and in a sufficiently fine stream such that the liquid penetrates the tissues without the aid of a skin-piercing needle, an orifice structure embracing a base flange portion and an integral tip extending therefrom, a passage extending through and between the outer faces of said base and tip, said passage adjacent the outer tip face embracing an orifice not substantially in excess of .01", a peripheral surface forming a part of said base flange and means defining relatively raised and recessed portions in said surface to furnish a portion for coupling said nozzle with a receptacle body.

2. A hypodermic injection nozzle including a base to provide a wall beyond the outer end of a medicament-containing ampule, a tip portion extending outwardly from said base and integral therewith, the outer end of said tip being defined by a non-penetrating face to merely contact a surface to be injected, said base and tip being provided with a passage extending from the outer face of the former to a point adjacent the face of said tip, an orifice of reduced diameter intervening such face and the adjacent passage end, a flange of reduced diameter extending from the periphery of said base and adjacent the outer face thereof, a flange of larger diameter extending adjacent the opposite face of said base and a flared surface intervening said flanges.

3. A hypodermic injection nozzle including a base to provide a wall beyond the outer end of a medicament-containing ampule, a tip portion extending outwardly from said base and integral therewith, the outer end of said tip being defined by a non-penetrating face to merely contact a surface to be injected, said base and tip being provided with a passage extending from the outer face of the former to a point adjacent the face of said tip, an orifice of reduced diameter intervening such face and the adjacent passage end and a pair of spaced flanges extending radially of said nozzle and included in said base, said flanges lying adjacent opposite faces of an ampule and receiving between them the edge of such an ampule.

References Cited in the file of this patent

UNITED STATES PATENTS

| Number | Name | Date |
| --- | --- | --- |
| 2,254,757 | Smith | Sept. 2, 1941 |
| 2,322,245 | Lockhart | June 22, 1943 |
| 2,380,534 | Lockhart | July 31, 1945 |
| 2,398,544 | Lockhart | Apr. 16, 1946 |
| 2,423,203 | Oldham | July 1, 1947 |
| 2,567,673 | Lawshe | Sept. 11, 1951 |
| 2,578,812 | Kollsman | Dec. 18, 1951 |